United States Patent [19]

Morimoto

[11] Patent Number: 4,653,382

[45] Date of Patent: Mar. 31, 1987

[54] PULL-TYPE PNEUMATIC BOOSTER

[75] Inventor: Hideyuki Morimoto, Yokosuka, Japan

[73] Assignee: Nippon Air Brake Co., Ltd., Japan

[21] Appl. No.: 844,844

[22] Filed: Mar. 27, 1986

[30] Foreign Application Priority Data

Apr. 3, 1985 [JP] Japan ................................ 60-70362

[51] Int. Cl.⁴ .............................................. F15B 9/10
[52] U.S. Cl. .................................. 91/369 A; 60/554; 91/6; 92/168
[58] Field of Search ..................... 60/547.1, 552, 554; 91/369 A, 6, 376 R; 92/168

[56] References Cited

U.S. PATENT DOCUMENTS

| | | | |
|---|---|---|---|
| 4,400,943 | 8/1983 | Belart | 60/554 |
| 4,423,597 | 1/1984 | Spielmann | 60/547.1 |
| 4,531,370 | 7/1985 | Hendrickson | 91/369 A |
| 4,535,591 | 8/1985 | Kobayashi | 91/369 A |
| 4,543,790 | 10/1985 | Coll | 91/369 A |

*Primary Examiner*—Abraham Hershkovitz

*Attorney, Agent, or Firm*—Kane, Dalsimer, Kane, Sullivan and Kurucz

[57] ABSTRACT

A pull-type pneumatic booster comprises an elongated plunger received in a body for sliding movement along an axis thereof. A movable member is slidably received in the body and defines a low and a high pressure chamber therein. The high pressure chamber is controlled by a valve device to communicate with either of the low pressure chamber and a high pressure source in accordance with the movement of the plunger. One end portion of the plunger extends beyond the movable member into the low pressure chamber. The plunger has the other end portion of a tubular configuration. The front and rear end portions of the plunger are snugly fitted in and disposed in sliding contact with an inner surface of a tubular portion the movable member for guiding the movement of the plunger along the axis of the body. A load-transmitting means is received in the tubular rear end portion of the plunger for transmitting a reaction force applied to the output member to the input member via the plunger.

8 Claims, 3 Drawing Figures

PULL-TYPE PNEUMATIC BOOSTER

BACKGROUND OF THE INVENTION

1. Field of the Invention

This invention relates generally to a pneumatic booster for assisting in operating a master cylinder of brake and clutch systems of a vehicle and particularly to a pneumatic booster of the pull type in which input and output forces of the booster are a pulling force.

2. Prior Art

Generally, the prior art boosters of the type described comprise a hollow body and a movable wall movably received in the hollow body to divide it into a low pressure chamber and a high pressure chamber, the low pressure chamber being kept at a predetermined low pressure while the high pressure chamber is selectively caused by valve means to communicate with either the low pressure chamber or an external pressure source. In the case of the booster of the negative pressure-type in which the low pressure chamber communicates with a negative pressure or vacuum source such as an intake manifold of a vehicle engine, the ambient atmosphere is used as the external pressure source of the high pressure chamber. On the other hand, in the case of the booster of the type in which the low pressure chamber is in communication with the ambient atmosphere, an air compressor is used as the external pressure source. In both cases, a boosting force is produced by a pressure differential between the low and high pressure chambers.

The movable wall has a rear portion slidably extending through a rear wall of the body, and an internal bore extending through the rear portion. A plunger is mounted in the internal bore and connected to an input member for axial movement therewith along the internal bore. The valve means has a valve seat formed on the plunger on which valve seat a valve element is adapted to rest to block off the communication of the high pressure chamber with the external pressure source. The input member is coupled to the plunger through a ball joint arrangement so that the valve element can be positively seated on the valve seat even if the input member is subjected to lateral movement. More specifically, the input member in the form of a rod has a rounded end, and the plunger has a ball-receiving socket in which the rounded end of the input member is received and retained to form the ball joint. An operating wire is secured to the input member and is connected to a brake pedal or a clutch pedal, and upon operation of such a pedal, the wire is pulled to move the input member. The prior art boosters of this type are disclosed in Japanese Patent Application Laid Open (Kokai) Nos. 58-89451 and 58-97550.

By virtue of the provision of the ball joint, the seating of the valve element on the valve seat is not adversely affected by the lateral movement of the input member. However, when the pedal is abruptly operated, for example, to apply an abrupt braking action, the seating of the valve element on the valve seat tends to be unstable, thereby causing a pressure leakage of the valve. This difficulty is considered to arise from the fact that the plunger is not accurately guided along its longitudinal axis.

Another conventional booster as disclosed in Japanese Patent Publication No. 57-36183 comprises a plunger or rod slidably extending through a cover member of a housing or body and a movable member slidably received in the housing, so that the movement of the plunger along its axis is guided by the cover member and the movable member. However, since the movable member is movable relative to both the plunger and the housing, this conventional booster suffers from the problems encountered with the above-mentioned conventional booster.

SUMMARY OF THE INVENTION

It is therefore an object of this invention to provide a pull-type pneumatic booster in which the plunger is guided to move accurately along its longitudinal axis to ensure a proper seating of the valve element on the valve seat to thereby prevent a pressure leakage of the valve.

According to the present invention, there is provided a pneumatic booster comprising:

(a) a body includes a major hollow portion and a first tubular portion of a smaller diameter extending said major portion, said body having an axis extending through said major portion and said first tubular portion;

(b) a movable member including a wall portion received in said major portion to divide an interior of said major portion into a low pressure chamber and a high pressure chamber, and a second tubular portion extending from said wall portion and received in said first tubular portion, said movable member being movable along the axis of said body, and said lower pressure chamber being in communication with a low pressure source;

(c) an elongated plunger received in said second tubular portion for sliding movement therealong;

(d) an input member connected to one end of said plunger;

(e) first and second air passage means;

(f) valve means mounted in said second tubular portion, said valve means comprising a first valve seat formed on said plunger, a second valve seat formed on an inner surface of said second tubular portion, and a valve element engageable with said first and second valve seats in accordance with the movement of said plunger along the axis of said body, said high pressure chamber being communicable with said low pressure chamber via said first air passage means when said valve element is disposed in engagement with said first valve seat, said high pressure chamber being communicable with a high pressure source via said second air passage means when said valve element is disposed in ingagement with said second valve seat; and (g) an output member connected to the other end of said plunger;

(h) the improvement wherein one end portion of said plunger remote from the other end thereof extends beyond said wall portion of said movable member into said low pressure chamber, said plunger has the other end portion of a tubular configuration remote from said one end thereof, said one and other end portions of said plunger being snugly fitted in and disposed in sliding contact with an inner surface of said second tubular portion for guiding the movement of said plunger along the axis of said body, there being provided a load-transmitting means received in said other end portion of said plunger for transmitting a reaction force applied to said output member to said input member via said plunger.

DESCRIPTION OF THE PREFERRED EMBODIMENT OF THE INVENTION

Figure 1:
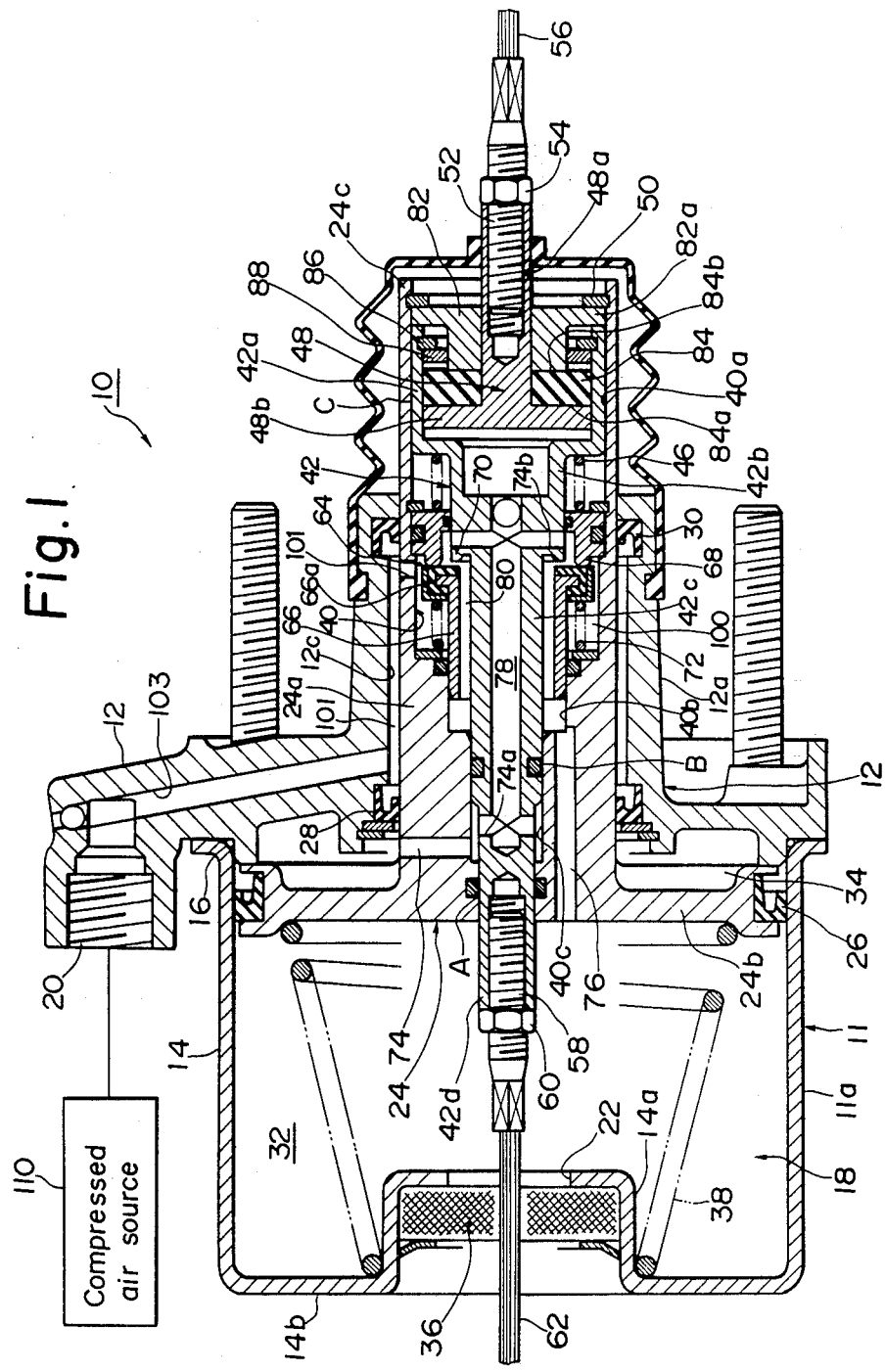
FIG. 1 is a cross-sectional view of a pull-type pneumatic booster provided, in accordance with the present invention.

A pull-type pneumatic booster 10 shown in FIG. 1 comprises a body 11 composed of a generally cup-shaped front shell 14 of a circular cross-section and a rear shell 12 of a greater thickness, the body having an axis extending through the front and rear shells 14 and 12. The rear shell 12 includes a tubular portion 12a less in diameter than the front shell 14, and a flange portion 12b formed at one end of the tubular portion 12a. The front shell 14 and the flange portion 12b are joined together through a seal ring 16 to form a major hollow portion 11a defining a space 18. The flange portion 12a has a compressed air-feed port 20. The front shell 14 has a socket portion 14a at a central portion thereof in which a filter member 36 is mounted, and an aperture 22 is formed through a bottom of the socket portion 14a.

A movable member 24 is slidably received in the hollow body 11. More specifically, the movable member 24 includes a tubular portion 24a extending through a bore 12c of the tubular portion 12a of the body 11 for sliding movement therealong, and a wall or flange portion 24b formed around the tubular portion 24a at an inner end thereof and slidably received in the front shell 14. A seal ring 26 is mounted on the outer periphery of the wall portion 24b and held in sliding contact with the inner periphery of the front shell 14. Also, a pair of seal rings 28 and 30 are mounted in a pair of peripheral grooves formed in the surface of the bore 12c of the tubular portion 12a at opposite ends thereof and held in sliding contact with the outer peripheral surface of the tubular portion 24a. The space 18 of the body 11 is divided by the movable wall 24b into a front low-pressure chamber 32 and a rear high pressure chamber 34. The low pressure chamber 32 is in communication with the ambient atmosphere through the aperture 22 and the filter member 36. The high pressure chamber 34 is communicable with the compressed air-feed port 20. A compression coil spring 38 is received in the low pressure chamber 32 and acts between a front wall 14b of the front shell 14 and the flange portion 12b of the rear shell 12.

The tubular portion 24a of the movable member 24 has an axial internal bore 40 extending therethrough, the internal bore 40 having a greater-diameter portion 40a, an intermediate-diameter portion 40b and a smaller-diameter portion 40c. An elongated plunger 42 is received in the bore 40 of the movable member 24 for sliding movement therealong. The plunger 42 has a front end portion 42d of a smallest diameter and a rear end portion 42a of a greatest diameter. The plunger further has a first intermediate portion 42c extending rearwardly from the front end portion 42d and a second intermediate portion 42b extending between the first intermediate portion 42c and the rear end portion 42a, the first intermediate portion 42c being smaller in diameter than the second intermediate portion 42b. The front end portion 42d and the first intermediate portion 42c are snugly fitted in and held in sliding contact with the smaller-diameter portion 40c of the bore 40 at regions A and B. Also, the rear end portion 42a is snugly fitted in and held in sliding contact with the greater-diameter portion 40a as at C to accurately guide the sliding movement of the plunger 42 along the axis of the bore 40, that is, the axis of the plunger 42. Thus, the portions 42d, 42c and 42a of the plunger 42 serve as guide portions for guiding the axial movement of the plunger 42, and the three guide regions A, B and C are all provided on the tubular portion 24a of the movable member 24. A return coil spring 46 is wound around the first and second intermediate portions 42c and 42b and acts between the tubular portion 24a of the movable member 24 and the plunger 42 to urge the plunger 42 rearwardly against a flange 82a of an end member 82 mounted in the greater-diameter portion 40a adjacent to a rear end 24c of the tubular member 24a, the end member 82 being retained in place by a retainer ring 50.

As described above, the rear end portion 42a of the plunger 42 which is received in the greatest-diameter portion 40a of the bore 40 for sliding movement therealong is of a tubular shape. An elastic member 84 in the form of a rubber disc serving as load-transmitting means is snugly fitted in the rear end portion 42a, the elastic member 84 serving to develop a reaction force. A front end portion of a connecting member 48 is also received in the rear portion 42a, and includes a hollow shank portion 48a and a flange 48b formed integrally on the front end of the shank portion 48b, the flange portion 48b being slidably received in the rear end portion 42a. The elastic member 84 is interposed between the flange portion 48b and the end member 82, and the shank portion 48a slidably extends through the elastic member 84 and the end member 82. The disc-shaped elastic member 84 has parallel front and rear faces 84a and 84b, and the front face 84a is engageable with the flange portion 48b of the connecting member 48. And, the rear face 84b is engageable at its inner radial portion with the end member 82 and is engageable at its outer radial portion with a transmission ring 88 held against the retainer ring 86. An output wire 56 has a bolt 52 fixedly secured to one end thereof, and the bolt 52 is threaded into the shank portion 48a of the connecting member 48, and a lock nut 54 is threaded on the bolt 52. The output wire 56 is adapted to be connected to a brake actuator or the like.

The smallest-diameter front end portion 42d of the plunger 42 extends through the wall portion 24b into the low pressure chamber 32. The front end portion 42d passing through the wall portion 24b is narrower than the other portions 42a, 42b and 42c of the plunger 42, thereby ensuring a sufficient strength of the wall portion 24b even if the movable member 24 is made of a plastics material. Thus, the length of the plunger 42 is sufficiently great that the front end portion 42d extends into the lower chamber 32. As a result, the span or distance between the opposite guide regions A and C can be made long, thereby positively guiding the axial movement of the elongated plunger 42. The front end portion 42d is of a tubular shape. An input wire 62 has a bolt 58 fixedly secured to one end thereof, and extends exteriorly of the body 11 through the aperture 22 and the filter member 36 for connection to a brake pedal (not shown). The bolt 58 is threaded into the tubular front end portion 42d, and a lock nut 60 is threaded on the bolt 58. The rubber disc 84, when compressed, serves to transmit a reaction force, applied to the output member 56, to the input member 62 via the plunger 42.

The low-pressure front chamber 32 is always in communication with the ambient atmosphere via the aperture 22 and the filter member 36. On the other hand, the high-pressure rear chamber 34 is controlled by valve means 64 so as to selectively communicate with either of the low pressure chamber 32 and an external source 110 of compressed air. More specifically, the valve means 64 is received in the greater-diameter portion 40a of the tubular portion 24a of the movable member 24, and comprises a tubular valve member 66 of which front end portion is slidably received in the intermediate-diameter portion 40b, an annular valve element 66a of rubber secured to a rear flanged end of the valve member 66, a first valve seat 70 defined by the front end of the second intermediate portion 42b, and a tubular sleeve 44 secured to the tubular portion 24a and fitted on the second intermediate portion 42b to permit a relative sliding movement therebetween, the front end 68 serving as a second valve seat of the sleeve 44. The first intermediate portion 42c extends through the valve member 66. The first valve seat 70 and the second valve seat 68 disposed outwardly thereof are disposed coaxially with each other and disposed in opposed relation to the valve element 66a. A coil spring 72 mounted around the valve member 66 urges it rearwardly so that the valve element 66a is normally, that is, in an inoperative condition, held against the second valve seat 68 and is spaced slightly from the first valve seat 70 as shown in FIG. 1.

In the inoperative condition of the booster 10, the high pressure chamber 34 is in communication with the low pressure chamber 32 via a passageway 74 formed in the tubular portion 24a, a port 74a formed in the front end portion 42d, a bore 78 of the first intermediate portion 42c, a port 74b formed in the second intermediate portion 42b, a passageway 80 formed between the tubular valve member 66 and the first intermediate portion 42c, and a passageway 76 formed in the tubular portion 42a. On the other hand, when the booster 10 is operated to pull the input wire 62 to move the plunger 42 forwardly, so that the first valve seat 70 is brought into sealing engagement with the valve element 66a, with the second valve seat 68 being disengaged from the valve element 66a. In this operative condition, the high pressure chamber 34 communicates with the source 110 of compressed air via the passageway 74, the port 74a, the bore 78, the port 74b, a space 100 formed between the tubular portion 24a and the valve member 66, a port 101 formed in the tubular portion 24a, a passageway 102 formed between the tubular portion 24a and the tubular portion 12a, a passageway 103 formed in the flange portion 12b and the feed port 20.

The opposite end portions 42d and 42a of the elongated plunger 42 serve as the guide portions which cooperate with the respective guide regions A and C for smoothly guiding the sliding movement along the axis thereof, so that the valve element 66a can seat on either of the valve seats 68 and 70 in a stable manner. In addition, the tubular rear end portion 42a is of a sufficient diameter that the reaction force-developing rubber disc 84 is accommodated within it. This is space-saving. Since a reaction force is produced by means of the rubber disc 84, hunting tending to occur when an abrupt braking action is applied can be suitably prevented. Further, the joint between the plunger 42 and the input member 62 is disposed outwardly of the movable member 24. This is advantageous from a standpoint of the strength of the movable member 24, and the overall size of the booster 10 can be of a compact size.

Figure 2:
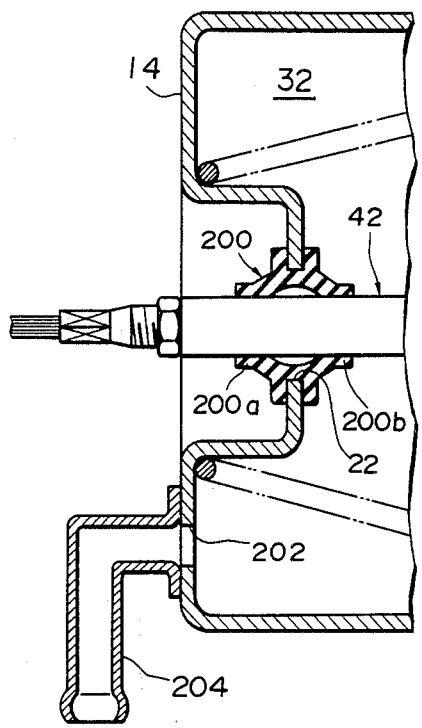
FIGS. 2 and 3 are fragmentary cross-sectional views of modified boosters, respectively.

According to a modified form of the invention shown in FIG. 2, a plunger 42 is longer to extend through the front shell 14 so that the joint between the input member 62 and the plunger 42 is positioned outwardly of the body 11 in the inoperative position of the booster 10. This arrangement facilitates the manipulation of the threaded bolt 58 and the lock nut 60 to adjust the combined length of the wire 62 and plunger 42. In this embodiment, the filter member 36 is omitted and instead a seal member 200 is fitted in the aperture 22, the seal member 200 having a pair of lips 202a, 202b at one end thereof. The plunger 42 sealingly extends through the seal member 200. A port 202 is formed through the front shell 14 at a lower portion thereof, and a fitting 204 is secured to the front shell 14 and is in communication with the port 202. A hose (not shown) is connected at one end to the fitting 204, and the other end of the hose is located at a position remote from the booster 10. During the operation of the booster 10, the air is introduced into and discharged from the low-pressure chamber 32 via the other end of the hose when the movable member 24 is moved, thereby generating a sound at the other end of the hose. Since the other end of the hose is remote from the booster, the driver or operator does not feel disagreeable.

Figure 3:
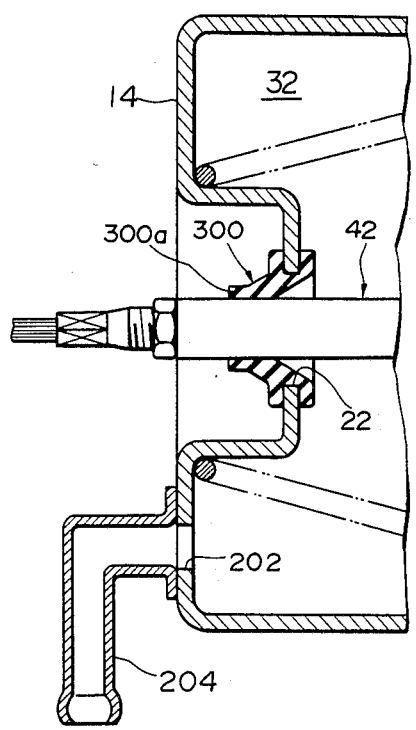

FIG. 3 shows another modified booster which differs from the booster of FIG. 2 in that a seal member 300 has only one lip 300a at an outer end thereof. In this embodiment, the port 202 and the fitting 204 may be omitted, in which case the air in the low-pressure chamber 32 deforms the lip 300a and flows past it.

While the booster 10 according to the present invention has been specifically shown and described herein, the invention itself is not to be restricted by the exact showing of the drawings or the description thereof. For example, although in the illustrated embodiment, the input member or wire 62 is directly connected to the front end portion 42d of the plunger 42, the connection may be made through the agency of a ball joint arrangement. Also, the retainer ring 50 may be omitted. In this case, a modified end member 82 includes a pair of concentric inner and outer tubular portions, the outer tubular portion having external threads in the outer surface thereof. The rear end section of the tubular portion 24a of the movable member 24 is made greater in diameter and has internal threads in the inner surface thereof. The inner tubular portion of the modified end member is fitted in the rear end portion 42a of the plunger 42 while the outer tubular portion of the end member is fitted between the rear end section of the tubular portion 24a and the rear end portion 42a of the plunger 42 with the outer tubular portion of the end member threadedly engaging the rear end section of the tubular portion 24a of the movable member 24.

What is claimed is:

1. In a pull-type pneumatic booster comprising:
   (a) a body includes a major hollow portion and a first tubular portion of a smaller diameter extending said major portion, said body having an axis extending through said major portion and said first tubular portion;
   (b) a movable member including a wall portion received in said major portion to divide an interior of said major portion into a low pressure chamber and a high pressure chamber, and a second tubular portion extending from said wall portion and received in said first tubular portion, said movable member being movable along the axis of said body, and said lower pressure chamber being in communication with a low pressure source;
(c) an elongated plunger received in said second tubular portion for sliding movement therealong;
(d) an input member connected to one end of said plunger;
(e) first and second air passage means;
(f) valve means mounted in said second tubular portion, said valve means comprising a first valve seat formed on said plunger, a second valve seat formed on an inner surface of said second tubular portion, and a valve element engageable with said first and second valve seats in accordance with the movement of said plunger along the axis of said body, said high pressure chamber being communicable with said low pressure chamber via said first air passage means when said valve element is disposed in engagement with said first valve seat, said high pressure chamber being communicable with a high pressure source via said second air passage means when said valve element is disposed in engagement with said second valve seat; and
(g) an output member connected to the other end of said plunger;
(h) the improvement wherein one end portion of said plunger remote from the other end thereof extends beyond said wall portion of said movable member into said low pressure chamber, said plunger has the other end portion of a tubular configuration remote from said one end thereof, said one and other end portions of said plunger being snugly fitted in and disposed in sliding contact with an inner surface of said second tubular portion for guiding the movement of said plunger along the axis of said body, there being provided a load-transmitting means received in said other end portion of said plunger for transmitting a reaction force applied to said output member to said input member via said plunger.

2. A pull-type pneumatic booster according to claim 1, in which said plunger has an intermediate portion intermediate said front and rear end portions thereof, said intermediate protion being snugly fitted in and disposed in sliding contact with the inner surface of said second tubular portion.

3. A pull-type pneumatic booster according to claim 1, in which there is provided a tubular valve member disposed in sliding contact with the inner surface of said second tubular portion for movement along the axis of said body, said valve element being of an annular configuration and being mounted on one end of said valve member, said first and second valve seats being annular and being disposed in concentric relation to each other.

4. A pull-type pneumatic booster according to claim 1, in which said low pressure source is the ambient atmosphere while said high pressure source is compressed air.

5. A pull-type pneumatic booster according to claim 1, in which said input member is coupled to said one end of said plunger by connecting means disposed in said low pressure chamber.

6. A pull-type pneumatic booster according to claim 1, in which said one end of said plunger is disposed exteriorly of said body.

7. A pull-type pneumatic booster according to claim 1, in which said load-transmitting means comprises a rubber disc.

8. A pull-type pneumatic booster according to claim 1, in which said plunger is of a tubular configuration, said one end portion of said plunger is the smaller in diameter than the remainder of said plunger.

* * * * *